Feb. 25, 1958  J. W. DOLBY  2,824,605
FUEL-AIR MIXING TUBE FOR GAS BURNERS
Filed Jan. 12, 1955
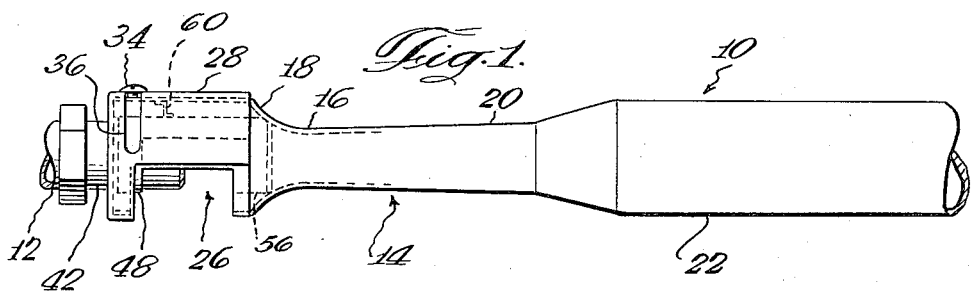
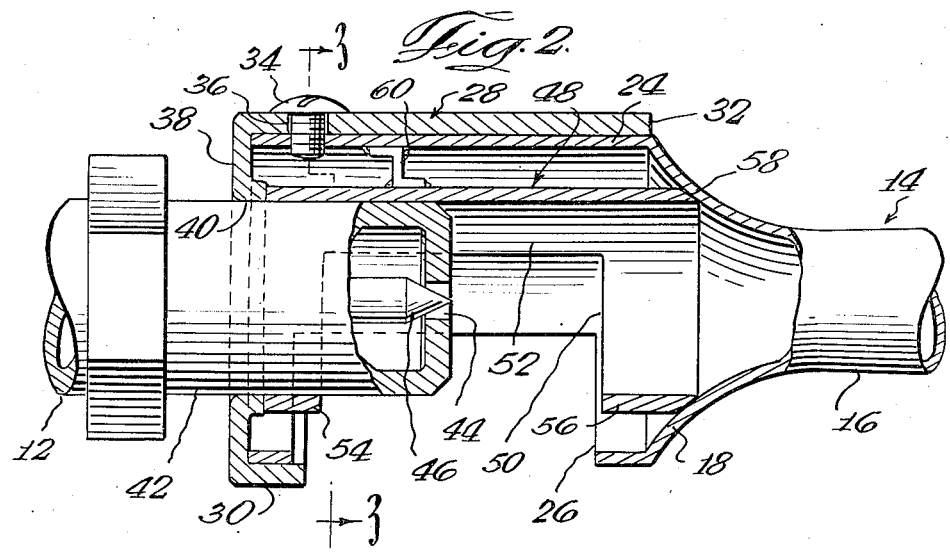
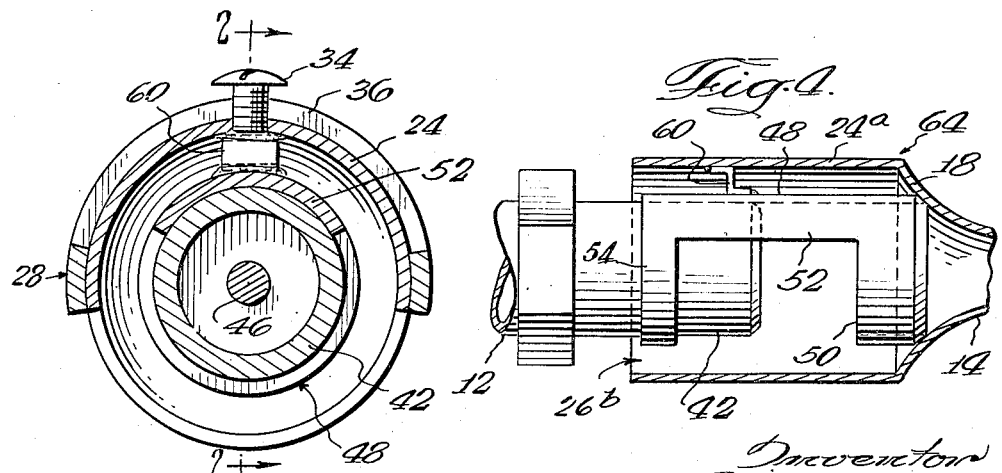
Inventor
John W. Dolby
By
Ooms, McDougall, Williams & Hersh
Attorneys

United States Patent Office 2,824,605
Patented Feb. 25, 1958

2,824,605

FUEL-AIR MIXING TUBE FOR GAS BURNERS

John W. Dolby, Elgin, Ill., assignor to Configured Tube Products Company, a corporation of Illinois Application January 12, 1955, Serial No. 481,372

4 Claims. (Cl. 158—118)

This invention relates to new and improved mixing tubes for mixing fuel and air in gas burner assemblies or the like. In gas cooking ranges, it is desirable to provide gas burners which will operate at a high heat output, such as 16,000 B. t. u. per hour or more, in order that water may be brought rapidly to a boil, and yet may be turned down to an extremely low heat output setting, on the order of 300 B. t. u. per hour, for example. A burner operated at such a low heat rate is useful for keeping cooked food warm without any danger of burning. Little difficulty has been experienced in constructing burners to provide a high heat output, but it has been found difficult to arrange a burner assembly so that a single burner will be capable of being turned down from a high heat output to an extremely low output. Generally, it has been found that burners capable of high heat ouput will go out well above a heat output of 300 B. t. u. per hour.

One principal object of the present invention is to provide a new and improved venturi type mixing tube, for use between a gas valve and a gas burner, whereby a gas burner of suitable type, capable of high heat output, may be turned down to a heat output on the order of 300 B. t. u. per hour.

Another object is to provide an improved mixing tube which will maintain a sufficient flow of gas-air mixture to a gas burner to maintain the operation of the burner, even when the rate of flow of gas from the gas valve into the mixing tube is turned down to a fraction of a cubic foot per hour in order to provide a low heat output.

It is a further object of the invention to provide a new and improved mixing tube having means for directing low energy gas through the mixing tube into the burner supplied thereby so that operation of the burner will be maintained.

Further objects and advantages of the invention will appear from the following description, taken with the accompanying drawings, in which:

Figure 1 is a side elevational view of a venturi type mixing tube constituting an illustrative embodiment of the invention;

Fig. 2 is an enlarged fragmentary side elevational view showing the entrance portion of the tube, the view being partly in vertical section, generally along a line 2—2 in Fig. 3;

Fig. 3 is a transverse sectional view taken through the mixing tube, generally along a line 3—3 in Fig. 2; and Fig. 4 is a longitudinal sectional view of a modified mixing tube constituting a second illustrative embodiment of the invention.

If Figs. 1–3 of the drawings are considered in greater detail, it will be seen that they illustrate a fuel-air mixing tube 10 adapted to receive gas from a gas valve 12, shown in fragmentary fashion. The mixing tube 10 is adapted to reliver a mixture of gas and air to any suitable gas burner (not shown), preferably one capable of a high heat output on the order of 15,000 to 20,000 B. t. u. per hour. The mixing tube 10 is so arranged that the gas valve 12 may be turned down to a flow rate of a fraction of a cubic foot per hour while still maintaining the operation of a burner. While problems are involved in constructing a gas valve which will operate properly and consistently when turned down to such a low fuel rate, the present invention is not concerned with the valve in itself and may be used in combination with any conventional or suitable valve capable of delivering gas at the requisite low rate of flow.

It will be seen that the mixing tube 10 comprises a venturi tube 14 having a narrow throat portion 16. Outwardly flaring entrance and exit portions 18 and 20 extend from the throat portion 16 in opposite directions. The exit portion 20 flares outwardly into an enlarged cylindrical tubular portion 22 which carries the mixture of fuel and air to the gas burner.

The flaring entrance portion 18 of the venturi tube 14 is connected to an entrance bell or housing 24 which may be of any suitable cross-sectional shape, but is generally cylindrical in the illustrated constructions. In order to admit air to the entrance housing 24, a downwardly opening slot 26 is formed in the lower part of the housing wall. It will be seen that the slot 26 is of considerable peripheral and longitudinal extent.

To regulate the effective size of the slot 26 a shutter 28 is mounted over the entrance housing 24. The illustrated shutter comprises a cylindrical portion 30 received over the rear end portion of the entrance housing 24. An arcuate cylindrically curved shutter blade or arm 32 extends longitudinally from the cylindrical portion 30 toward the venturi tube 14 and is adapted to be moved over the slot 26 to any desired degree. The shutter 28 may be locked in position by means of a locking screw 34 which extends through a peripheral slot 36 in the shutter and is threaded into the entrance housing 24.

To receive the gas valve 12, the shutter 28 is formed with an end wall 38 closing the open end of the entrance housing 24. An axial aperture 40 is formed in the end wall 38 to admit the valve 12. It will be seen that the valve 12 has a nozzle or spud 42 which projects through the aperture 40 into the housing 24 of the mixing tube. The nozzle 42 is axially disposed in the housing 24 and is generally cylindrical in form. An orifice 44 is formed axially in the end of the nozzle 42 to direct gas into the housing 24 and thence into the venturi tube 14. The illustrated gas valve 12 is provided with an adjustable needle valve 46 projecting into the orifice 44 so as to regulate the flow of gas through the orifice.

When the gas valve 12 is turned down to a very low flow rate, amounting to a fraction of a cubic foot per hour, the gas issuing from the orifice 44 has a very low energy, with the result that the gas tends to rise upwardly in the entrance housing 24 and partially diffuse throughout the housing rather than flow in a stream into the venturi tube 14.

In accordance with the invention, such low energy gas is diverted and directed into the venturi tube 14 by means of a baffle or hood 48. While the hood may vary in shape and may be formed integrally with the entrance bell or housing 24, it is illustrated as a cylindrical sleeve having a downwardly opening slot 50 extending through its lower wall. The slot 50 defines an arcuate upper baffle wall 52 which extends longitudinally between the gas nozzle 42 and the venturi tube 14. The baffle wall 52 limits upward movement of the stream of gas into the entrance housing 24 and thus prevents the gas from losing its kinetic energy and diffusing into the housing. The stream of gas is thereby directed downwardly into the venturi tube 14.

It will be seen that the slot 50 extends through a major portion of both the periphery and the length of the baffle sleeve 48. Thus, the baffle sleeve does not materially restrict the flow of air into the venturi tube 14. At one terminal end of the slot 50, the sleeve 48 has a continuous cylindrical portion 54 which is alined with the axial aperture 40 in the shutter end wall 38. Thus, the gas nozzle 42 extends into the cylindrical ring-like portion 54. At the opposite end of the slot 50, the baffle sleeve 48 has another ring-like cylindrical portion 56 extending into the flaring entrance portion 18 of the venturi tube 14. The front end of the cylindrical portion 56 may be formed with a beveled annular edge 58 which may engage the flaring venturi entrance portion 18, although it is also permissible to leave clearance at this point. The baffle member 48 is secured in proper alinement with the entrance housing 24 by a suitable means of support, such as a bracket 60 which is welded to both the sleeve and the entrance housing.

In operation, gas is directed through the entrance bell or housing 24 and thence into the venturi tube 14 by means of the gas nozzle 42. Air is drawn into the venturi tube 14 through the slot 26 in the entrance housing. The rate of gas flow through the orifice 44 in the gas nozzle 42 may be regulated by adjusting the needle valve 46. When the gas flow is adjusted to an extremely low rate, the gas issues from the orifice 44 with very little kinetic energy, with the result that the gas tends to rise upwardly into the entrance housing 24. However, the stream of gas encounters the baffle wall 52 which overlies the end of the nozzle 42 and extends into the venturi tube 14. The effect of the baffle wall 52 is to divert the gas downwardly and direct it into the venturi tube 14. In this way, the kinetic energy of the flowing gas is conserved, with the result that the flow of gas and air to the burner is considerably strengthened at low flow rates. It has been found that a gas burner of proper design can be capable of a high heat output and still may be turned down to a heat output which will exceed only slightly, if at all, an output of 300 B. t. u. per hour.

Fig. 4 illustrates a modified mixing tube 64 which is the same in function as the one shown in Figs. 1–3, and is essentially the same in construction except that it is provided with an entrance housing 24a having an air intake opening 26a which is fixed rather than adjustable in size. It will be seen that the air intake opening 26b is defined by leaving the rear end of the housing 24a open. Thus the housing 24a is continuously cylindrical and is unslotted. The shutter of the first embodiment is omitted. The illustrated baffle 48, gas valve 12, and venturi tube 14 are the same as in the first embodiment. In view of the omission of the shutter, the cylindrical end portion 54 of the baffle sleeve 48 constitutes the sole element for maintaining the mixing tube in alinement with the gas valve 12.

In operation, air is drawn in through the end opening 26b of the second embodiment and thence flows through the slot 50 into the venturi tube 14. Gas issues from the gas nozzle 42 and is diverted downwardly into the venturi 14 by the upper baffle wall 52 of the baffle 48. At low rates of flow, the baffle 48 conserves the flow energy of the gas and thereby maintains the burner in constant operation.

Various modifications, alternative constructions and equivalents may be employed without departing from the true spirit and scope of the invention as exemplified in the foregoing description and defined in the following claims.

I claim:

1. A mixing tube for use with a gas burner, comprising, in combination, a venturi tube having a narrow throat portion and outwardly flaring exit and entrance portions extending in opposite directions therefrom, a generally cylindrical bell portion connected to said entrance portion and defining an opening for admitting air thereto, a hood mounted in said bell portion and comprising a sleeve of substantially less outer diameter than the inner diameter of said bell portion and axially disposed therein, said sleeve having a slot formed in its lower and side wall portions and extending throughout a major portion of both the length and periphery of said sleeve, said sleeve having a cylindrical front portion disposed forwardly of said slot and extending into said flaring venturi entrance portion, said sleeve also having a cylindrical rear portion disposed rearwardly of said slot and adapted to receive a gas nozzle, bracket means fixedly mounting said sleeve on said bell portion, said sleeve having an arcuate upper wall portion disposed above said slot and spaced a substantial distance downwardly from the top wall portion of said bell portion for diverting gas downwardly into said venturi entrance portion so that said mixing tube will provide a fuel-air mixture capable of maintaining a burner in operation at an extremely low rate of gas flow.

2. For use with a gas burner, a mixing tube comprising, in combination, a venturi tube having a narrow throat portion and flaring entrance and exit portions extending in opposite directions therefrom, a cylindrical entrance housing connected to said entrance portion and having an air entrance slot formed therein, a shutter received over said cylindrical housing and having a segmental cylindrically curved element for adjustably restricting said slot to regulate the flow of air therethrough, said shutter having an end wall at the end of said cylindrical housing opposite from said venturi entrance portion, said end wall having an axial aperture therein adapted to receive a gas nozzle, a baffle disposed in said cylindrical housing and comprising a sleeve of substantially less outer diameter than the inner diameter of said cylindrical housing and disposed axially therein in alined relation with said axial aperture for receiving the front end of the gas nozzle, said sleeve having a slot therein alined with said slot in said cylindrical housing and extending throughout a major portion of the periphery of said sleeve, said sleeve having a cylindrical front end portion extending into said flaring entrance portion of said venturi tube, bracket means fixedly mounting said sleeve on said housing, said sleeve having an arcuate top wall thereon disposed above said slot therein and spaced a substantial distance downwardly from the top of said housing for guiding a stream of gas issuing at a slow rate from the gas nozzle into said venturi entrance portion, said top wall being confined to a narrow zone overlying the axis of said housing with lateral space under said top wall and between the axis and said housing.

3. A mixing tube for use with a gas burner, comprising, in combination, a venturi tube having a narrow throat portion and outwardly flaring exit and entrance portions extending in opposite directions therefrom, a generally cylindrical bell portion connected to said entrance portion, said bell portion having a downwardly facing opening in the lower portion thereof for admitting air thereto, a hood mounted in said bell portion and comprising a sleeve of less outer diameter than the inner diameter of said bell portion and axially disposed therein, said sleeve having a slot formed in its lower side wall and extending throughout a major portion of both the length and periphery of said sleeve, said sleeve having a cylindrical front end portion disposed forwardly of said slot and extending into said flaring venturi entrance portion, said sleeve also having a cylindrical rear end portion disposed rearwardly of said slot and adapted to receive a gas nozzle, bracket means fixedly mounting said sleeve on said bell portion, said sleeve having an arcuate upper wall portion disposed above said slot and spaced a substantial distance downwardly from the top of said bell portion for diverting gas downwardly into said venturi entrance portion so that said mixing tube will provide a fuel-air mixture capable of maintaining a burner in operation at an extremely low rate of gas flow, said upper wall portion being confined to a narrow zone overlying the axis of said bell portion so as not to obstruct the flow of air.

4. A mixing tube for use with a gas burner, comprising, in combination, a venturi tube having a narrow throat portion and outwardly flaring exit and entrance portions extending in opposite directions therefrom, a generally cylindrical bell portion connected to said entrance portion and having an open end to define an opening for admitting air to said bell portion, a hood mounted in said bell portion and comprising a sleeve of less outer diameter than the inner diameter of said bell portion and axially disposed therein, said sleeve having a slot formed in its lower side wall and extending throughout a major portion of both the length and periphery of said sleeve, said sleeve having a cylindrical front end portion disposed forwardly of said slot and extending into said flaring venturi entrance portion, said sleeve also having a cylindrical rear end portion disposed rearwardly of said slot and adapted to receive a gas nozzle, bracket means fixedly mounting said sleeve on said bell portion, said sleeve having an arcuate upper wall portion disposed above said slot and spaced a substantial distance downwardly from the top of said bell portion for diverting gas downwardly into said venturi entrance portion so that said mixing tube will provide a fuel-air mixture capable of maintaining a burner in operation at an extremely low rate of gas flow, said upper wall portion being confined to a narrow zone overlying the axis of said bell portion so as not to obstruct the flow of air.

References Cited in the file of this patent

UNITED STATES PATENTS

| | | |
|---|---|---|
| 1,392,016 | Kuenhold | Sept. 27, 1921 |
| 1,545,605 | Rusch | July 14, 1925 |
| 1,815,176 | Auter | July 21, 1931 |

FOREIGN PATENTS

| | | |
|---|---|---|
| 294,828 | Great Britain | Aug. 2, 1928 |